(No Model.)

G. H. SACKETT.
GRIPPING CLAMP FOR LINES OR REINS.

No. 331,088. Patented Nov. 24, 1885.

WITNESSES:
Gunvald Aas.
Albert Finkelstone.

INVENTOR
George H. Sackett.
BY James A Whitney
ATTORNEY

UNITED STATES PATENT OFFICE.

GEORGE H. SACKETT, OF BROOKLYN, NEW YORK.

GRIPPING-CLAMP FOR LINES OR REINS.

SPECIFICATION forming part of Letters Patent No. 331,088, dated November 24, 1885.

Application filed September 29, 1884. Serial No. 144,289. (No model.)

*To all whom it may concern:*

Be it known that I, GEORGE H. SACKETT, of Brooklyn, in the county of Kings and State of New York, have invented certain Improvements in Gripping-Clamps for Lines, Reins, &c., of which the following is a specification.

The object of this invention is to provide a simple, cheap, durable, and effective means for connecting to any suitable or desired support lines, reins, straps, the flexible edges or portions of garments, shawls, &c., my said invention having, therefore, a wide range of usefulness, and being capable of various modifications, according to the said purpose for which in any given case it may be intended.

Figure 1:
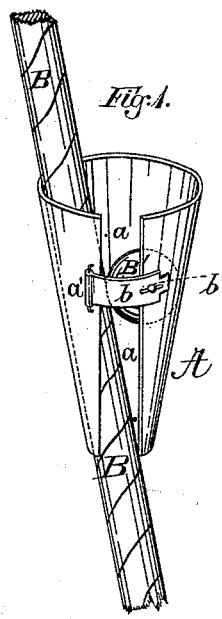
Figure 2:
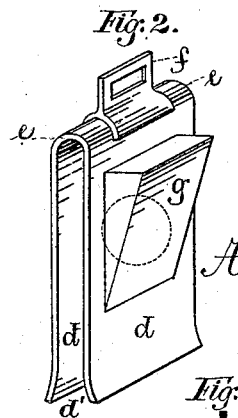
Figure 6:
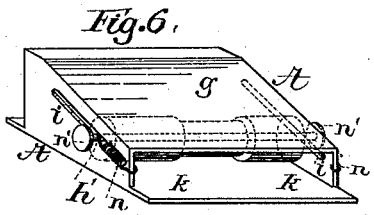

Figure 1 is a perspective view showing my said invention. Fig. 2 is a perspective view, and Fig. 3 a longitudinal transverse sectional view representing modification thereof. Fig. 4 is a perspective view, and Fig. 5 a longitudinal sectional view representing another modification of my said invention; and Fig. 6 is a perspective view representing another modification of my said invention.

Having reference first to Fig. 1, A is a conical shell, slotted at one side, as shown at *a*, in order that it may be slipped upon the line B. This conical shell may be provided with a hasp, *b*, extended across the slot *a* to connect the two opposite sides of the shell, and hold the same against the spreading strain exerted thereon, as hereinafter explained. In such case the hasp may be hinged at one side of the slot by a hinge, *a'*, and at the opposite end catch over a stud, *b'*. The object of said slot is to permit the rope or line B to pass sidewise into the shell A. When the apparatus is to be used in connection with a rope or line, B, free at one end, the slot may be dispensed with and the rope or line inserted endwise into the conical shell A. When the rope rests upon and parallel with one side of the conical shell A, the opposite side of the latter forms an inclined plane with reference to the rope or line. A spherical roller, B', is dropped into the shell A between said inclined plane and the rope or line, so that when the rope or line is drawn toward the smaller end of the shell A said roller will grip upon rope or line and prevent the movement in said direction of said rope or line, whereas when the rope or line is drawn in the opposite direction the roller will readily yield to permit the movement of the rope or line in said opposite direction, from which it follows that the rope or line may be adjusted longitudinally to be gripped at any portion of its length to resist movement in the direction of the smaller end of the shell. Said shell A is attached by riveting or in any suitable manner to any desired support or article intended to connect with the rope or line B through the gripping action of the roller, as aforesaid. Thus, for example, the two ends of a rope or line may be connected by affixing the shell A to one end, and passing the other through the said shell and in connection with the roller B', as hereinbefore explained.

It is of course to be understood that as an equivalent of the shell A a post or other support may have formed therein a conical socket corresponding in form to the interior of said shell A, which said socket will serve the same purpose as said shell.

Figure 3:
Figure 4:
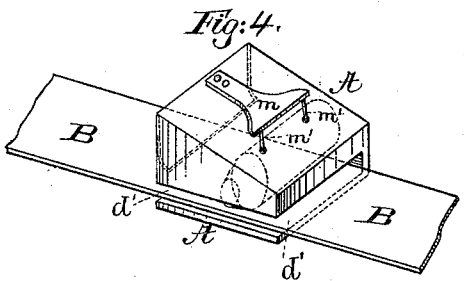

In the modification represented in Figs. 2 and 3 the shell A is composed of two parallel leaves, *d*, united at their inner ends, *e*, and which may be attached to a strap or to any other suitable article by means of the eye *f*, or equivalent device. In one of the leaves *d* is formed a chamber, *g*, the outer side of which constitutes an inclined plane, and in said chamber, and capable of passing more or less into the space between the two leaves *d*, is the roller B', which may be either spherical or cylindrical. A strap, the edge of a garment, or any other flexible article, being passed up edgewise through the space *d'* between the outer ends of the leaves *d*, passes between the roller B' and the face of the opposite leaf *d*, the roller yielding to permit this insertion of the strap, flexible article, or the like; but said roller being moved inward to grip the article between itself and the just mentioned opposite leaf *d* when attempt is made to draw the strap or edge outward through the space *d'*.

Figure 5:
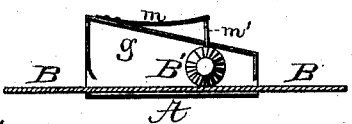

In the modification represented in Figs. 4 and 5 the shell A has an opening corresponding to the opening *d'* of Figs. 2 and 3, and indicated by the same reference-letter, *d'*; but in this case the opening is at the side of said shell. The shell A has a chamber corresponding to the chamber *g* of Figs. 2 and 3, but in this case embracing substantially the whole opposite side of the shell. It is indicated by the same reference-letter, g, as in Figs. 2 and 3. The strap, as the equivalent of the rope or line B, is indicated by the same reference letter, and is inserted laterally through the opening d'. The roller B' is cylindrical, and, being placed within the chamber g, is loosened when the strap B is moved in one direction, and tightened by the action of the inclined plane of the said chamber g when the strap is drawn in the opposite direction. A flat spring, m, is attached at one end to the outer surface of the chamber g, and at its free end is provided with studs m', which pass through holes in the side of the chamber g in such manner that when the roller is rolled back from its grip on the strap the said studs m' will act upon the surface of the roller B', to retain the same at such distance from the inner end of the inclined plane of said chamber as to prevent the roller from gripping on the strap during the longitudinal adjustment of the strap to the position at which it is to be gripped.

In the modification represented in Fig. 6 the flat surface k has opposite to it the inclined plane of the chamber g with a suitable space between, the roller B' being placed in the said space. This roller is tubular or with a central bore, through which is passed a shaft, h', the ends of which pass through but are not acted upon by slots i, these slots simply permitting the ends of the shaft h' to project while the roller is acted upon by the inclined plane of the chamber g, as herein explained. A spiral spring at the inner end of each of these slots is arranged to draw the shaft h' toward the inner or lower end of the incline, the shaft h' preferably sliding, as distinguished from rolling through the slot i. The strap or article to be held is inserted endwise between the roller B' and the surface k. The springs n forthwith draw the roller B inward or upward by their draft on the shaft h' and cause the roller B' to be gripped directly upon the surface of the strap, which is between the roller and the surface k. Thumb-pieces n' are attached to the extremities of the shaft h', and afford means whereby the said shaft may be moved to bring the roller B' away from the strap, so as to be there retained during any desired longitudinal adjustment of the strap with reference to the said roller and to the surface k.

The springs need only be used in those cases wherein the position of the device is such that the gravity of the roller is not available to bring it into position to grip the strap, line, or other article to which it may be applied.

It is of course to be understood that the shell A, roller B', &c., may be made of metal or any suitable material. In some cases the roller may be made of a slightly elastic or yielding material—such, for example, as india-rubber, leather, cork, and the like. The roller B' may, when desired, be composed of separate sections placed end to end on the shaft h'. These sections may be of varying diameters. The sections may be, as indicated in dotted outline in the drawings, of lesser diameter at the center, in order that the grip may be greatest at the edges of the strap; or the roller may consist of spheres or spheroids axially bored, in order that they may be strung or placed on the shaft h'. When desired, a slot may be formed in the outer side—in other words, the inclined wall of the chamber g—so as to permit the roller B' to be reached or acted upon, to hold it back from its grip on the strap during the longitudinal adjustment of the latter in place.

What I claim as my invention is—

1. In a suspended clasp or similar device, the combination of a tapering tube or shell, constructed substantially as described, and a ball or roller adapted to be actuated by the tapering portion of said tube or shell to grip a strap, cord, garment, or like article, all substantially as herein set forth.

2. In a suspended clasp or similar device, the combination of a tapering tube constructed substantially as described, and a ball adapted to be inserted in the larger end of the tube and adapted to hold a strap, cord, or garment, substantially as set forth.

3. The combination of a shell, A, having a bearing-surface against which the article to be gripped may be pressed, a gripping-roller, B', an inclined plane for causing said roller to grip the article when the same is moved in one direction, and to release the article when the same is moved in the opposite direction, and means for retaining the roller out of grip upon the article during the adjustment of the latter, all substantially as and for the purpose herein set forth,

GEORGE H. SACKETT.

Witnesses:
GUNVALD AAT,
ALBERT FINKELSTONE.